Oct. 31, 1967        J. A. MOULTON ETAL        3,350,571
    SIGNAL COMPRESSION APPARATUS EMPLOYING SELECTIVELY
    ENABLED AMPLIFIER STAGES UTILIZED IN A MONOPULSE
Filed Dec. 23, 1963          ANGLE-OFF-BORESIGHT RADAR
                                          9 Sheets-Sheet 1

INVENTORS
JAMES A. MOULTON
BY ALBERT E. SIMPSON

ATTORNEY

INVENTORS
JAMES A. MOULTON
ALBERT E. SIMPSON
BY
ATTORNEY

INVENTORS
JAMES A. MOULTON
ALBERT E. SIMPSON
BY

ATTORNEY

INVENTORS
JAMES A. MOULTON
ALBERT E. SIMPSON

United States Patent Office 3,350,571
Patented Oct. 31, 1967

3,350,571
SIGNAL COMPRESSION APPARATUS EMPLOYING SELECTIVELY ENABLED AMPLIFIER STAGES UTILIZED IN A MONOPULSE ANGLE-OFF-BORESIGHT RADAR
James A. Moulton, Santa Ana, and Albert E. Simpson, Buena Park, Calif., assignors to North American Aviation, Inc.
Filed Dec. 23, 1963, Ser. No. 332,472
8 Claims. (Cl. 307—88.5)

ABSTRACT OF THE DISCLOSURE

Signal compression apparatus for a multi-channel signalling system, whereby the signal level of at least one channel of the multi-channel system is maintained below a preselected signal level. First gain-switching means controls the gain of a first channel between a plurality of discrete gain levels in response to the amplitude of the signal level of the first channel, and second gain-switching means discretely varies the gain of a second channel similarly as the discretely varied gain of the first channel.

---

In the data processing and signal transport of signals employed in multi-channel signalling systems, it is often required that the signals be amplified to a useful signal level prior to effecting other processing or transport of such signals. Further, it is frequently required that a given relative gain or fixed signal level ratio be maintained among the several signals of a multi-channel signal system. Such fixed relationship is required where it is desired to subsequently combine the several signals of the multi-channel signalling system in order to produce a resultant signal indicative of the amplitude ratios or signal level ratios existing among the several signals.

For example, in a sum-and-difference monopulse radar receiving system, the microwave signals received by two antenna apertures are combined in a multi-channel signal section to provide two microwave signals, one being indicative of the sum of the received signals and the other indicative of the difference between the received signals. In a so-called "off-boresight data" monopulse radar system, the received signal caused by a detected target is processed to provided information as to the angular amount by which the target is off the boresight or directional axis of the directional antenna of the monopulse radar. One method of obtaining such target angle information is to divide the difference signal by the sum signal, by means of separate sum and difference automatic gain control (AGC) circuits commonly employing the output of the sum channel AGC as a control signal. In this way, a normalized resultant difference signal is provided which is substantially invariant with changes in received signal strength due to target range or target size or target coefficient of reflectivity. Instead, the resultant normalized difference signal varies only in response to variations in the angle-off-boresight of the detected target (measured in the plane of the coplanar array of the two antenna apertures). Hence, such resultant signal is said to be indicative of the target angle-off-boresight.

In "processing" or normalizing the difference signal, it is required that the sum and difference signals be amplified by like amounts in order to avoid disturbing or distorting the relative signal level or gain relationship between them. Any difference in the relative gain relationship between them is referred to as a gain-tracking error. Such error arises from the differences or performance tolerances existing between the separate amplifiers employed to separately amplify the sum and difference signals, and results in loss of accuracy of the indicated target angle-off-boresight.

In practice, it is difficult to build and adjust two AGC signal amplifier channels that will behave exactly alike for all signal levels (e.g., for weak signals and strong signals). In other words, the gain performance of the two AGC amplifiers will not "track" or identically follow each other at all levels of the common gain control input, although it is possible to adjust them to correspond closely over a preselected, narrowly-limited, range of gains and input signal levels.

Further, in practice the sum channel signal and difference channel signal will be of considerably different signal levels, and hence, gain tracking errors are encountered. Moreover, the sum channel signals, generally being larger in amplitude than the difference signals, will vary over a wider range of signal levels, so as to preclude precision adjustment or matching of the conventional difference channel AGC amplifier to the sum channel AGC amplifier.

Accordingly, it is a broad object of the inventive concept to provide multi-channel signalling means which are operated within a limited performance region, as to better allow matching and mutual adjustment among the signalling means of the several channels.

Another aspect of interest in the procuring of the several signals of a sum-and-difference type monopulse receiver is the adverse effect of the phase detectors employed to determine the phase sense of the difference signal relative to the sum signal, corresponding to the sense of the target angle-off-boresight. In an off-boresight type monopulse data processor, phase tracking errors between the sum and difference signal channels produce errors in the resulting signal. Such error is equal to $(1-\cos \theta)$ expressed as a percent, where $\theta$ is the phase-shift difference angle occurring in one of the sum and difference channels, relative to the other. In other words, the output of the phase-detected difference signal is attenuated by the amount, $\cos \theta$. The phase shift difference ($\theta$) itself is referred to as the phase tracking error.

Another source of error introduced in the phase-detected difference signal arises from cross-talk occurring between the sum and difference channels by means of the phase detector itself. Hence, in the presence of a strong target (producing a strong sum signal), which lies upon the antenna boresight (thereby producing a zero difference signal), cross-talk between the two channels occurring within the phase detector will produce an erroneous difference signal indication, or at least limit both the minimum target angle-off-boresight which may be detected by the prior means, and the resolution to within which a target angle signal may be resolved.

Accordingly, it is a further aspect of the concept of the invention to provide improved multiple channel signalling means having reduced sensitivity to phase-tracking errors.

In a preferred embodiment of the subject invention there is provided a multi-channel signalling system. There is also provided signal-compression means for maintaining the output signal level of at least one channel of the multi-channel system below a preselected level and comprising successive gain or amplifying stages in each of the signal channels of the multi-channel system. Switchable means are included in each signal channel of the multi-channel system for varying successive gain stages of said channel by preselected discrete amounts. Also provided is logic means responsive to the signal level of one of the signal channels and cooperating with the switchable means for concurrently switching by like amounts the gains of the channels of the multi-channel system.

In normal operation of the above described system, the logic means functions to concurrently switch the gains of the several amplifying means of the multi-channel signalling system, so as to increase the gains as the signal level decreases, and to decrease the gains as the signal level increases. Hence, the output signals of the successive amplifying stages of at least one channel are maintained within a preselected signal level. Further, in a multi-channel signalling system such as a sum and difference monopulse receiver, in which the sum channel response is employed to control the logic switching, each of the amplifying stages of both signal channels is operated at a single preselected gain by means of the invention. Hence, amplifier matching between channels is more easily accomplished at such single gain point, as to avoid prior art AGC gain-tracking problems between the channels of the multichannel signalling system, while effecting signal compression.

In the application of the invention to a monopulse receiver system, a phase-sensitive detector, responsively connected to the multiple signalling channels, is employed as a switching control signal for selectively switching one of two video-detected difference signals of mutually opposite sense. Hence, phase-tracking errors are also minimized. Further, in the particular application of the invention to a monopulse receiver such as the logarithmic difference type, the limited range signal levels of the device also limit the required dynamic range of the signal-normalizer or logarithmic difference detector, thereby improving the performance accuracy of the signals provided by a specific logarithmic difference detector.

Accordingly, it is an object of the subject invention to provide improved multiple-channel signalling means.

It is another object of the invention to provide multiple-channel signalling means having improved gain- and phase-tracking characteristics.

It is a further object of the subject invention to provide multiple-channel signal compression apparatus for limiting the output signal levels of each signalling channel.

It is still another object of the invention to provide discrete gain change means for concurrently switching the gains of each channel of a multi-channel signalling system in response to the signal level condition of one of those channels.

These and other objects of the subject invention will become apparent from the following description taken together with the accompanying drawings in which.

In the figures, like reference characters refer to like parts.

Figure 1:
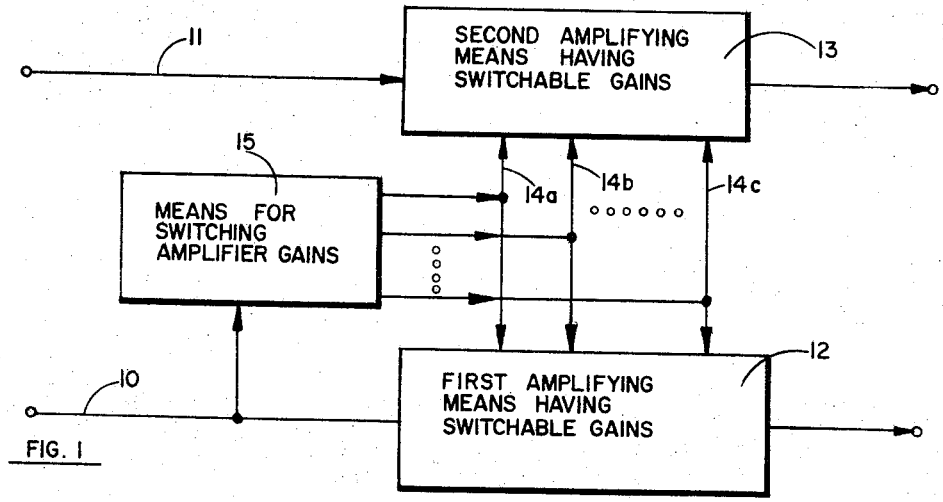
FIG. 1 is a block diagram of a multiple-channel signalling system employing the concept of the invention.

Referring now to FIG. 1, there is illustrated in block form a multi-channel signalling system employing the concept of the invention. There are provided first and second signalling channels 10 and 11 employing first and second amplifying means 12 and 13, respectively. Amplifying means 12 and 13 are similarly constructed and arranged, and each is adapted to having its gain discretely changed or switched in response to switching inputs applied on lines 14a, 14b and 14c. There is further provided means 15 responsive to the signal level or state of the first signalling channel for providing amplifier gain switching signals. The gain switching signals are applied to lines 14a, 14b and 14c of amplifying means 12 and 13 for discretely changing the gains thereof.

In normal operation of the device of FIG. 1, the gains of amplifiers 12 and 13 are switched concurrently by switching signals from switching means 15 by like amounts, whereby the relative gain levels existing between the inputs of amplifiers 12 and 13 are preserved at the outputs thereof. In other words, the amplitude ratio of the output of element 13 to the output of element 12 is the same as the ratio of the input of element 13 to the input of element 12. Further, the gains for amplifiers 12 and 13 are increased and decreased by switching means 15 as the signal level on channel 10 decreases and increases, respectively. In other words, signal compression occurs, whereby the outputs of elements 12 and 13 tend to remain within a preselected range of signal levels.

Although only three discrete gain-switching inputs to each of the amplifying means of FIG. 1 have been illustrated, it is to be appreciated that the concept of the invention is not so limited, and that any finite number of discretely switched gains may be employed.

Further, although the exemplary multiple-channel signalling system of FIG. 1 has been illustrated as comprising only two channels, it is to be appreciated that the concept of the invention is equally applicable to signalling systems having more than two signal channels.

Figure 2:
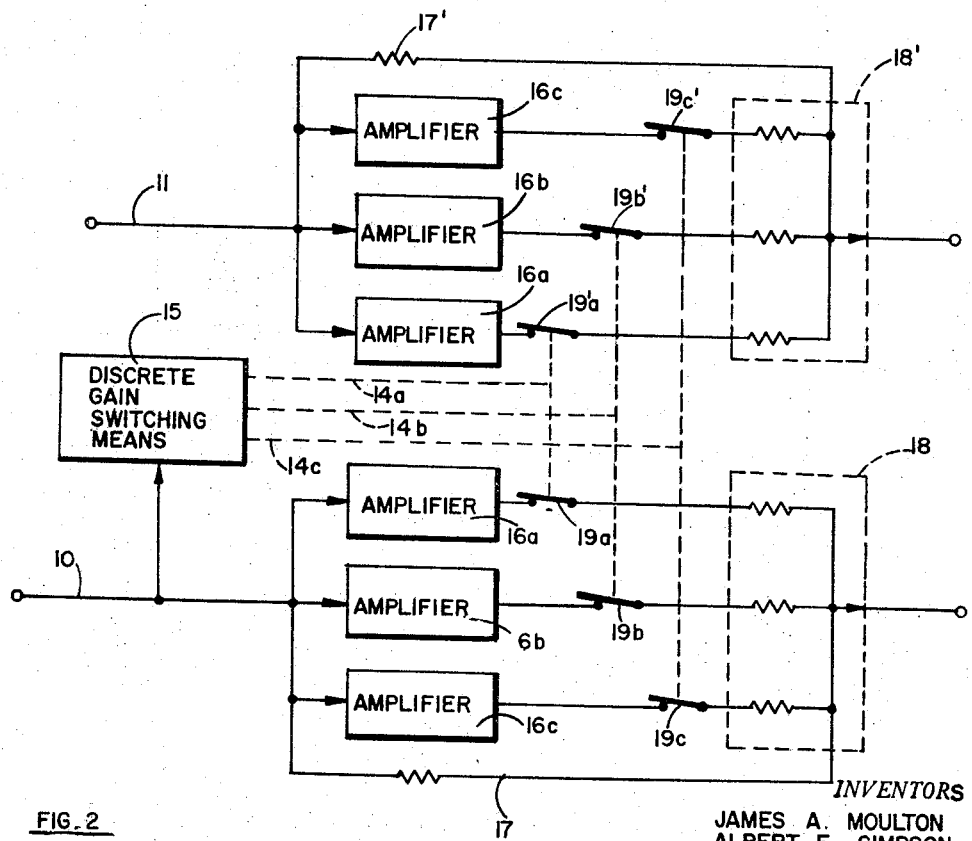
FIG. 2 is a block diagram illustrating one embodiment of the invention.

An exemplary arrangement of amplifying means having switchable gains is shown more particularly in FIG. 2.

Referring to FIG. 2, there is illustrated a schematic diagram, partially in block form, of one embodiment of the device of FIG. 1. There is provided a multi-channel signal system, having like gain adjusting means interposed in series circuit with each signal channel of the multi-channel system. Each gain-adjusting means is comprised of signal summing means 18 and a like plurality of signal-amplifiers 16a, 16b and 16c, the output of each amplifier being operatively connected to a mutually exclusive one of the inputs of the associated summing means.

Interposed between each amplifier and the associated summing means is signal-gating means 19, the gates of corresponding amplifiers in each channel being commonly operated by a common gating or switching input.

There is further provided discrete gain-switching means 15 responsive to one of the signal channels for providing mutually exclusive signal level or signal state of such signal channel.

Element 15 may be comprised of a plurality of threshold amplifiers or comparators each having a successively higher threshold voltage of operation and commonly responsive to input line 10. The construction and arrangement of threshold amplifiers is well known to those skilled in the art, being described for example at page 298 of "Electronic Analog Computing" by Korn and Korn (second edition), published by McGraw-Hill (1956). Accordingly element 15 is shown in block form only.

The respective outputs of switching means 15 are connected to mutually exclusive ones of the switches in each channel whereby corresponding switches of each channel are driven by a common input. In other words, the first or high threshold indicator line 14a from switch signal means 15 commonly drives first switches 19a and 19a' of the first and second channels 10 and 11 respectively; the second or intermediate threshold indicator 14b from switch signal means 15 commonly drives second switches 19b and 19b' of the first and second channels respectively; and the third or lowest threshold level indicator 14c commonly drives switches 19c and 19c'. The switches are all shown in the de-energized (normally-on) position.

In normal operation of the device of FIG. 2, the presence of a signal applied to the input of first channel 10, and having a signal level above the maximum threshold indicator 14c of threshhold means 15, would cause switching outputs to appear on all of lines 14a, 14b and 14c, whereby all of switches 19 would be caused to open. In this condition, the respective inputs applied to channels 10 and 11 would not be amplified, and would appear unamplified at the corresponding outputs of the corresponding ones of summing means 18 and 18'.

If the high-amplitude of the input applied to first channel 10 is successively decreased, then successive ones of control lines 14a, 14b and 14c will cease to maintain "switch-open" control outputs, and the switches in common driven relationship to each such control output will be closed. Hence, the amplified outputs of the amplifiers in each channel will be combined at the associated summing means of such channel, whereby the total gain or amplification of the applied input is discretely increased.

In other words, the total gain may be expressed as the sum of the gain terms of the signals summed by the summing means. Where, for example, the amplifiers have similar nominal gains, the total effective gain ($G_T$) provided by the amplifiers is equal to the number of amplifiers switched on ($n$) multiplied by the nominal gain for a single amplifier ($G$).

$$G_T = nG \quad (1)$$

To this may be added the term unity, to include the non-switched summing path 17 provided by the embodiment of FIG. 2, in order to completely describe the effective gain ($G_T'$) of such embodiment:

$$G_T' = 1 + nG \quad (2)$$

Hence, it is to be appreciated that the device of FIG. 2 provides discrete signal compression action by decreasing the number ($n$) of amplifier stages switched-on in each channel as the input signal level of a preselected channel increases, and by increasing such number as such input decreases below the signal levels corresponding to such numbers.

Although the embodiment of FIG. 2 effects discrete compression of signals, yet such embodiment does not necessarily or conveniently lend itself to limiting the signal levels in the amplifiers to preselected signal levels, whereby a set of corresponding switched amplifiers of each channel may be more precisely matched for such restriction range of performance.

It is to be observed, for example, that each amplifier in each channel is directly connected to the input of such channel, and therefore, is required to perform over the entire signal level range for which such amplifier is to be used. Hence, for extremely large signal ranges, separate amplifier designs having successively higher saturation levels would be required. Also, a plurality of threshold amplifiers having different thresholds is required. Such multiplicity of elements of different design also increase the production cost of such an embodiment.

Figure 3:
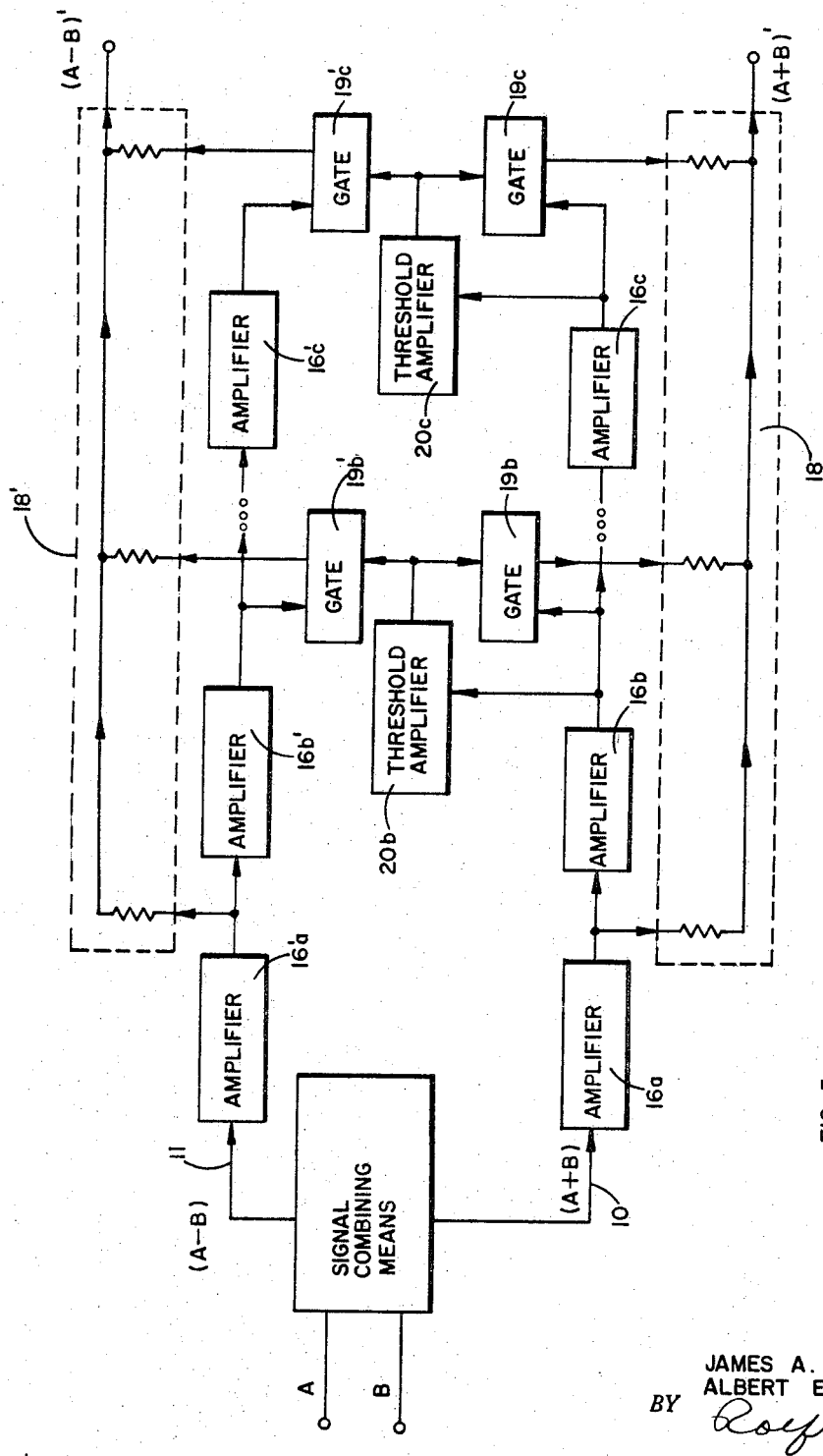
FIG. 3 is a block diagram illustrating an alternate embodiment of the invention.

Switchable means for utilizing amplifiers so as to obtain a wider range of signal compression, is shown in FIG. 3.

Referring to FIG. 3, there is illustrated in block form and partially in schematic form an alternate embodiment of the invention. There is provided a plurality of signal channels 10 and 11, each channel having a like plurality of amplifiers 16, representing the sum and difference channels, respectively, associated with two monopulse receiver channels, the gated outputs of which are summed by summing means 18. However, the amplifiers in each channel are interconnected in cascade, or series, the input of only the first amplifier of the series being connected directly to the input terminal of the associated signal channel. Threshold signalling means, such as a threshold amplifier 20, is responsively connected to the output of a mutually exclusive one of the gated amplifiers 16 of the first or sum channel 10, for providing a gating-off signal when the output level of such amplifier exceeds a preselected threshold or signal level. The output of such threshold amplifier is commonly fed as a control input to the corresponding gate of the gated amplifiers of each channel. For example, threshold signalling means 20b is responsively connected to the ungated output of gated amplifier 16b (in channel 10), and the output of threshold means 20b is fed to gates 19b and 19b' of channels 10 and 11, respectively. Similarly, the input of threshold amplifier 20c is responsively connected to the ungated output of amplifier 16c (in channel 10), and the output thereof is fed to gates 19c and 19c'.

The threshold of operation of each of driven threshold amplifiers 20b and 20c is adjusted to the desired maximum output level of an associated one of driving amplifiers 16b and 16c, for which precision gain matching of associated sets of corresponding amplifiers is to be achieved. For example, the threshold level of threshold signalling means 20b is designed (by means well understood in the art) to be equal to or less than the maximum output signal level of amplifiers 16b and 16b' for which linearity of the desired precision is obtainable.

Where amplifiers 16a, 16b and 16c employ a common design, then threshold amplifiers 20b and 20c may employ a common threshold, whereby the number of parts of common design and interchangeability is increased, and the production costs of the system are reduced.

In normal operation of the device of FIG. 3, signal gating means 19b, 19b', 19c and 19c' are normally closed in the absence of a control signal applied thereto from the corresponding ones of the threshold signalling means 20b and 20c. Accordingly, the gain of output of the summing means 18 associated with each of channels 10 and 11 relative to the input to such channel, is represented by the sum of the gains of each of the amplifier stages connected thereto, as in the case of the device of FIG. 1. However, the effective gain of each amplifying stage summed by summing means 18 in FIG. 3 differs from that of FIG. 2, in that such gain is determined by the number of cascaded amplifiers in such stage; the output of the last amplifier (16c or 16c') providing an output of the highest signal level or amplitude. For example, the effective gain of the output of last amplifier 16c is the product of the individual gains of cascaded amplifiers 16a, 16b and 16c; while the gain of the output of second amplifier 16b is the product of the gains of cascaded amplifiers 16a and 16b.

When the signal level of the input applied to channel 10 is successively increased, the level of the output of the last amplifier 16c will exceed the threshold of associated signalling means 20c. In response to such signal condition, threshold means 20c will feed a gating signal to gates 19c and 19c', thereby gating-off the outputs of amplifiers 16c and 16c' from associated summing means 18 and 18' respectively. Hence, the effective gain of each channel of the device of FIG. 3 is now represented by the product of the gains of the amplifier stages remaining connected in circuit with summing means 18. As the amplitude or signal level of the input to channel 10 increases still further, eventually the output level of amplifier 16b (the last amplifier in the series of cascaded amplifiers still operatively connected to summing means 18) reaches the threashold of threshold signalling means 20b. In response to such condition, signalling means 20b opens gates 19b and 19b', whereupon only one amplifier (e.g., 16a and 16a', respectively) remains operatively connected to summing means 18 and 18', respectively. Hence, the gain of each of channels 10 and 11 is then merely that of the single operatively connected amplifier.

It is to be understood, that as the input level of the input signal applied to channel 10 is decreased from a maximum, then the outputs of successive ones of the amplifiers of each channel successively fall below the threshold of the associated threshold signalling means driven by such amplifier, whereupon such amplifier and the corresponding one in the other channel(s) are reconnected to the summing means in each channel.

In other words, the effective gain ($G_T$) of each channel is indicated by the sums of the gains of the operatively connected amplifying stages. The number ($n$) of cascaded amplifiers in each stage is equal to the number designating such stage. For example, the first stage has only one amplifier (16a); the second stage has two amplifiers in cascade (16a and 16b), and the third stage has three amplifiers in cascade (16a, 16b and 16c). When a common amplifier design is employed for each of amplifiers 16, then the gain ($G_n$) of a particular stage ($n$) is determined by the common gain ($G$) of a single amplifier, multiplied by itself a number of times corresponding to the number ($n$) of cascaded amplifiers in such stage:

$$G_n = G^n \quad (3)$$

Hence, the effective gain ($G_T$) of the channel is determined by the sum of the gains of those stages operatively connected to the output summing means 18 in FIG. 3:

$$G_T = \Sigma G_n = G + G^2 + \ldots + G^n \quad (4)$$

Therefore it is to be appreciated that the device of FIG. 3 provides signal compression, whereby the effective gains of the channels are discretely and concurrently increased and decreased as the input to the sum channel decreases and increases, respectively. Such increased signal compression is obtained because the effective system gain is determined by a sum of products of the individual stage gains (rather than by the mere sum of the individual gains, as in FIG. 2). Further, the performance range of the system can be easily multiplied by merely connecting further stages in cascade together with the associated threshold signalling and gating means.

Therefore, the concept of the described invention provides means for maintaining the output level of the system within a preselected level, and at the same time maintaining the output level of each amplifying stage of multistage amplifying means within such preselected signal level. Accordingly, more precise matching of corresponding amplifiers of each channel can be achieved for a multi-channel signalling system, whereby gain-tracking errors among such channels are eliminated.

Figure 4:
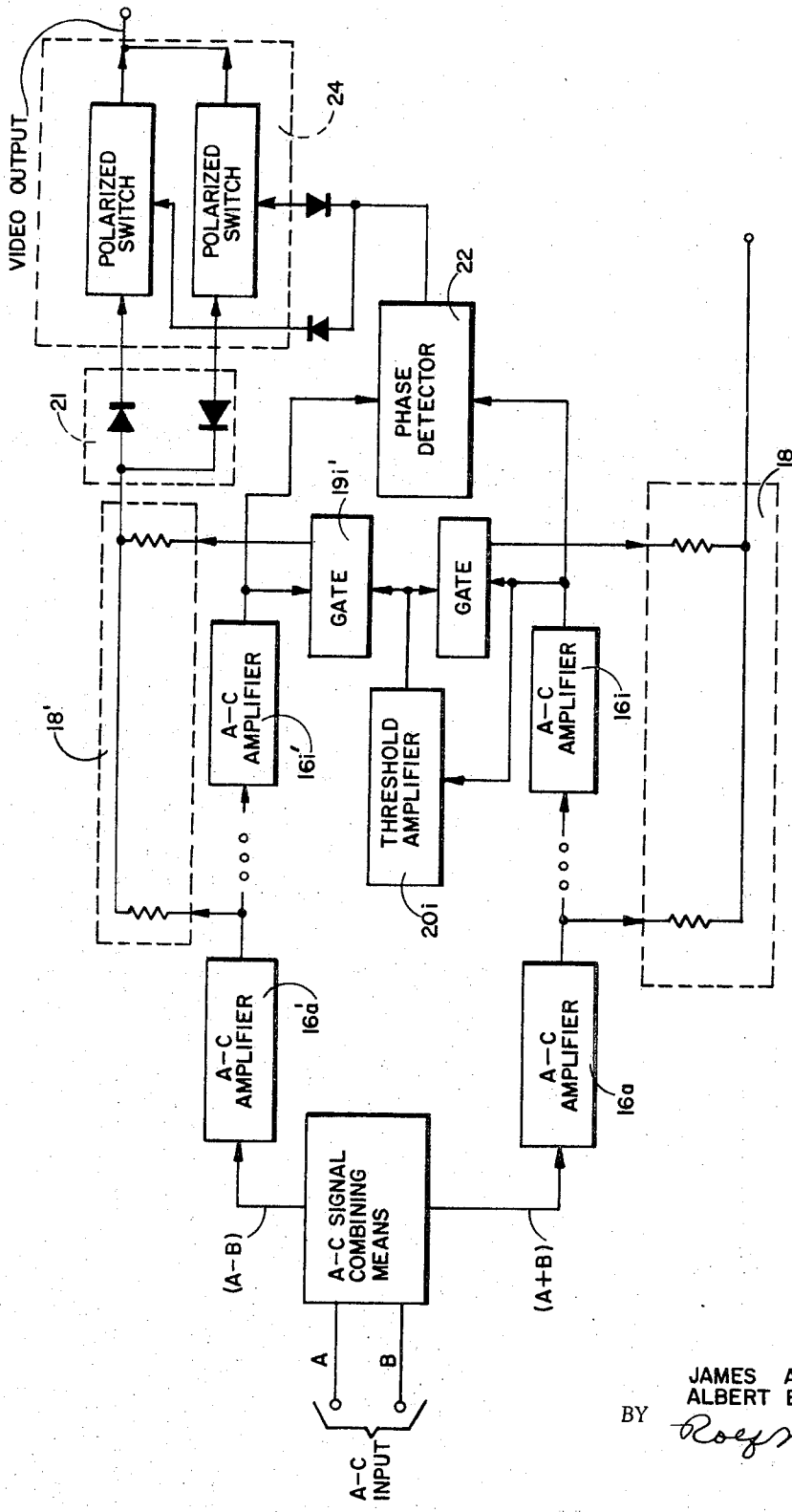
FIG. 4 is a block diagram illustrating an additional concept of the invention.

Another aspect of the invention related to reducing phase-shift sensitivity or phase-tracking errors is shown in FIG. 4.

Referring to FIG. 4, there is illustrated the device of FIG. 3 including means cooperating therewith for reducing phase tracking errors in the phase-sensitive detection of a bi-polar difference signal. The device of FIG. 4 is essentially a multi-channel system for severally amplifying the sum and difference of two A-C input signals such as the pulsed A-C signals received by a monopulse radar receiver. The frequency of the periodic sum and difference signals may be reduced, for example, to 360 megahertz by means of a local oscillator and associated mixers, as is well-known in the radar signalling art. Such intermediate frequency (IF) signals are amplified by cascaded IF amplifiers 16 of respective channels of the multi-channel signalling system.

Video detection and inverting means 21 is responsively connected to the output of A-C difference signal summing means 18' for severally providing first and second video detection signals of mutually opposite polarities. Such element may be comprised for example of two oppositely poled diodes commonly connected to the output of summing means 18'.

There is further provided a phase-detector 22 responsively connected to the output of the last amplifier stage of each of the two signal channels, for providing a switching control signal indicative of the phase-sense of the A-C difference signal relative to the A-C sum signal.

Interposed at each of the outputs of video detection and inverting means 21 is switching means 24 responsive to the switching control signal (from element 22) for selectively switching that output of video means 21 having a polarity corresponding to the phase-sense of the amplified A-C difference signal.

By means of such switching arrangement, a phase-sensitive video difference signal is obtained which is insensitive to phase-tracking errors occurring between the sum and difference signal channels, due to phase shift performance differences therebetween, because the phase-detector output is used for switching control, rather than for analog data or intelligence purposes. Further, because the maximum level difference signal from the last cascaded difference amplifier stage 16i, is employed at phase detector 22, the effects of performance thresholds of the phase detector are minimized. Accordingly, the device of FIG. 4 provides switching means for reducing both gain tracking and phase-tracking errors in an improved multi-channel signalling system.

Hence, improved signal-compression means for multichannel signalling systems has been described. Although only three cascaded amplifiers have been illustrated in each of the signal channels depicted in FIGS. 3 and 4, it is understood that the concept of the invention is not so limited and that any like number of amplifiers may be employed in each channel of the multiple signalling channels.

Figure 5:
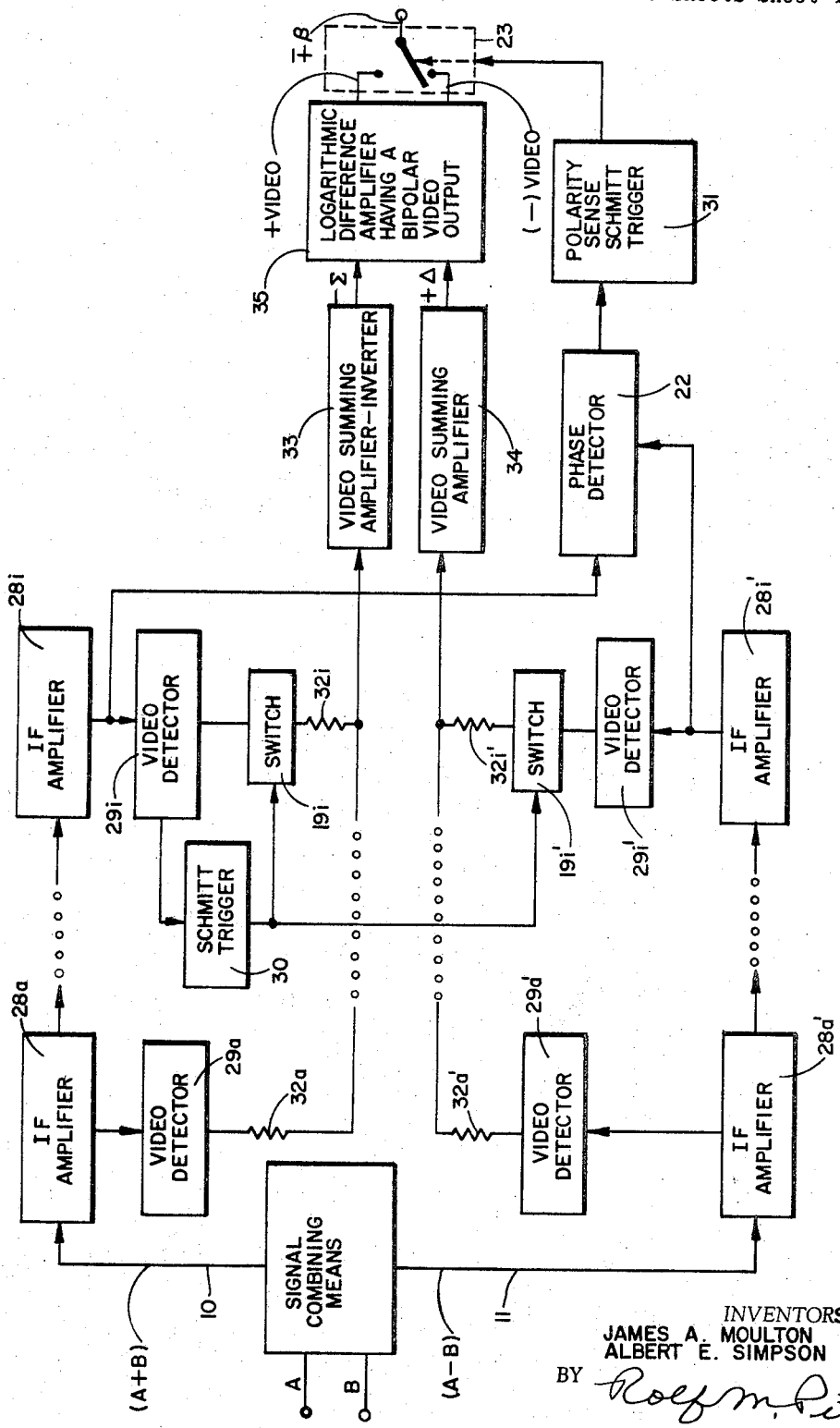
FIG. 5 is a block diagram of a preferred embodiment of the invention.

In the application of the device of the invention to a logarithmic amplitude-difference type monopulse radar receiver, signal compression is preferably done at the video level, and the compressed video signal outputs of the device are employed by logarithmic difference signalling means to provide an output signal indicative of the amplitude ratio of a sum signal and corresponding difference signal, as shown in FIG. 5. By reason of the signal compression of the received signals, the limited logarithmic range of the signalling means may be usefully employed with received signals having a wide dynamic or amplitude range.

Referring to FIG. 5, there is illustrated an embodiment of the invention adapted for use in a logarithmic monopulse receiver. The sum and difference IF signals of channels 10 and 11 respectively, are each applied to a respective series of cascaded IF amplifiers 28 and 28'. An output of each IF amplifier is video detected before being further processed, for the reason that video signals are more conveniently adapted to such processing than are IF signals. Hence, video outputs of like sense from the sum channel video detectors 29a through 29i are summed at the input of video summing and inverting amplifier 33 by means of corresponding summing resistors 32a through 32i; and the difference channel video signals of like sense are similarly summed at the input of difference channel video summing amplifier 34.

Interposed between sum channel video detector 29i and associated summing resistor 32i is a video signal switch 19i, and similarly interposed between corresponding elements of the difference signal channel is a corresponding video signal switch 19i'. Each of switches 19i and 19i' is commonly controlled by the output of a Schmitt trigger 30, which is responsively connected to an output of sum channel video detector 29i. Hence, when the output of sum channel video detector 29i reaches or exceeds a preselected level or threshold, signalling means 30 switches off switches 19i and 19i', thereby effecting signal compression of the respective video inputs to implifiers 33 and 34 in response to the IF outputs from the signal combining means.

The outputs of video summing amplifiers 33 and 34 ($\Sigma$ and $\Delta$) are combined by logarithmic video means 35 to provide a first and second video output of mutually opposite polarity and which is indicative of the ratio $\beta$ (beta):

$$\pm \beta = \log (A) - \log (B) \approx K\left[\frac{A-B}{A+B}\right]$$

where: $K=$ a constant of proportionality.

Switch means 23 selectively switches that output of logarithmic means 35 having a sense corresponding to the phase-sense of IF difference signal ($A-B$) relative to IF sum signal ($A+B$). Switch means 23 is controlled by a polarity-sensitive Schmitt trigger 31 responsively connected to the output of phase detector 22, which employs the outpus of sum channel IF amplifier 28i and difference channel IF amplifier 28i' to generate an output signal indicative of the relative phase-sense of the difference channel IF signal.

Preferred embodiments of several of the elements of FIG. 5 are illustrated in FIGS. 6, 7, 8, 9 and 10.

Figure 6:
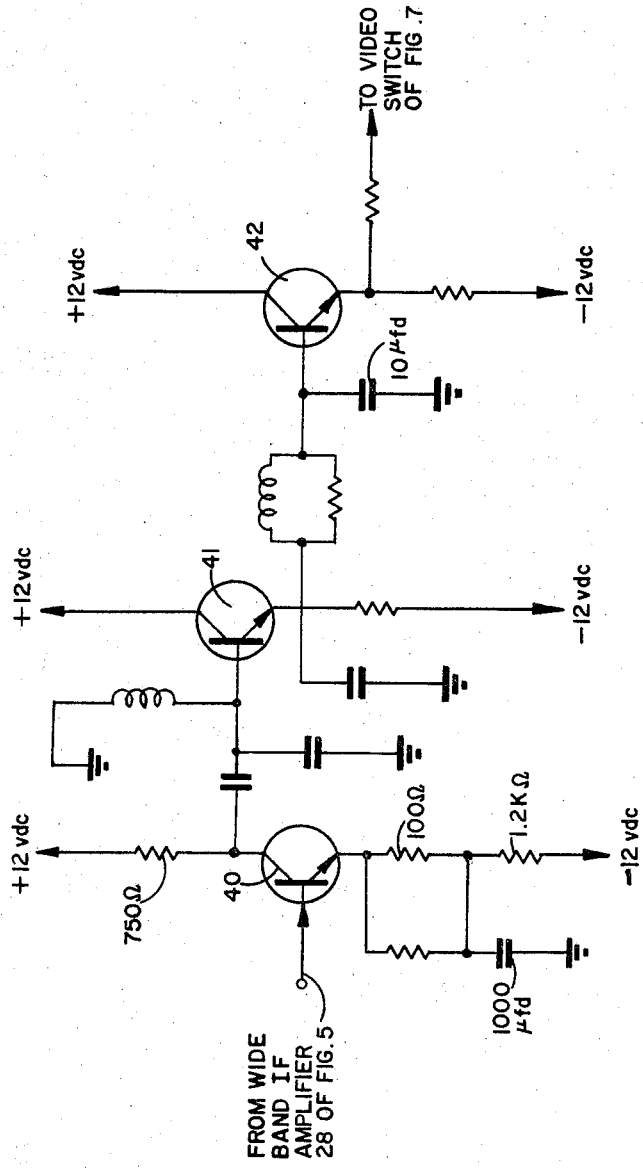
FIGS. 6, 7, 8, 9 and 10 are detailed circuit schematics of several elements of FIG. 5.

Referring to FIG. 6, there is illustrated a circuit schematic of the video detectors 29 of FIG. 5, as adapted for use in a radar system. The first transistor 40 of the device of FIG. 6 comprises a wide-band amplifying stage, the second transistor 41 serves as the video detector, while the third transistor 42 comprises a video emitter-follower stage. Wide band IF amplification is provided to allow fuller use of the linear dynamic range of the video detector. A transistor detector is employed, rather than a diode detector, in order to achieve a higher input impedance, improved temperature stability and improved frequency response.

Figure 7:
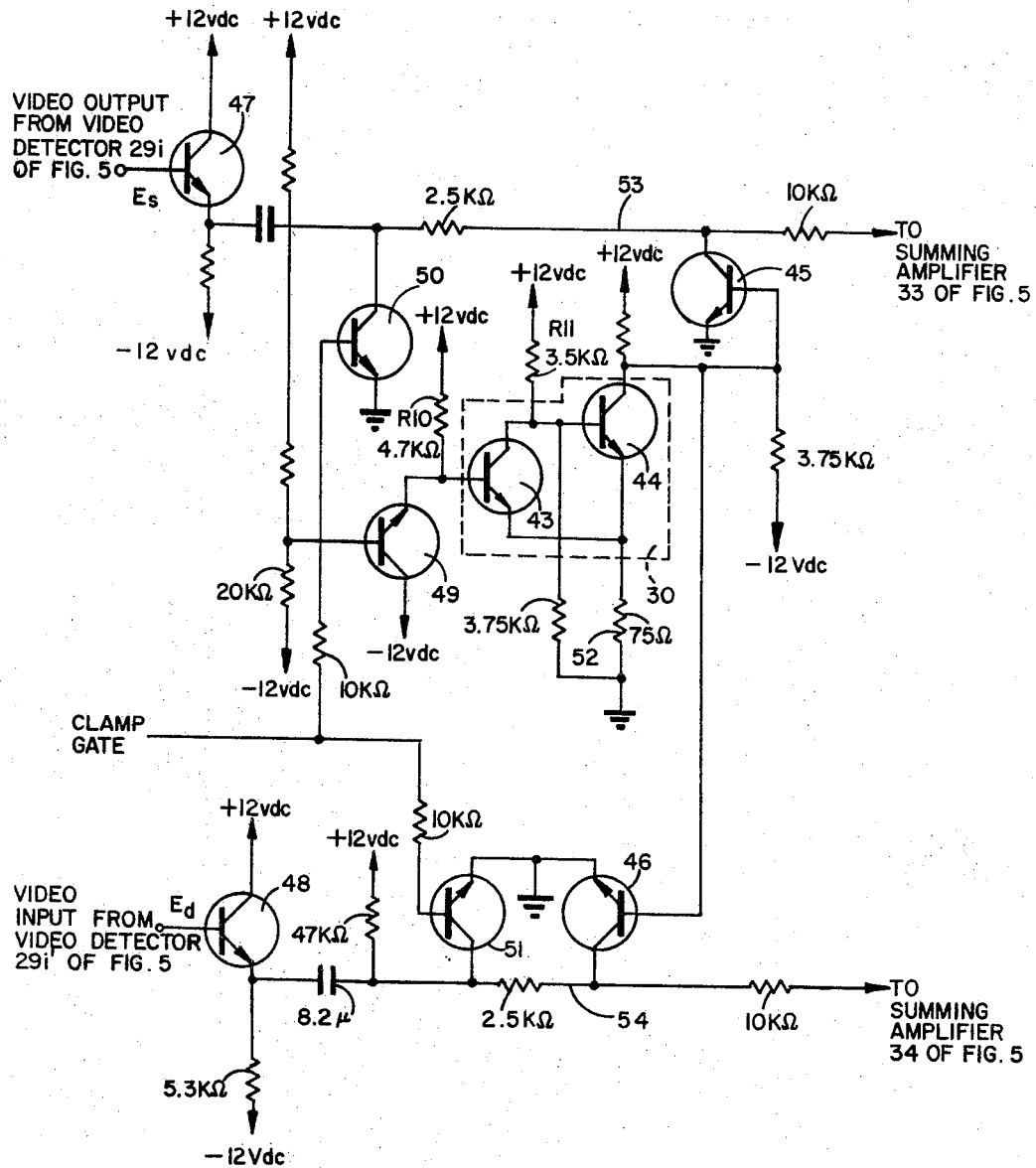

The outputs of video detectors 29i and 29i' of FIG. 5 may be switched by means of the switching and trigger arrangement shown in FIG. 7.

Referring to FIG. 7, there is illustrated a circuit schematic of the Schmitt trigger 30, sum channel switch 19i and difference channel switch 19i' of FIG. 5. The two transistors 43 and 44 comprise the Schmitt trigger of FIG. 5, which is responsively connected to the video output of the sum channel detector 29i (of FIG. 5). Transistors 45 and 46 respectively comprise sum channel switch 19i and corresponding difference channel switch 19i' of FIG. 5.

Transistors 47, 48 and 49 and are merely emitter-followers, inserted for impedance isolation. The emitter-follower 49 also provides temperature compensation for the base-emitter junction of transistor 43 (the first stage of the Schmitt trigger).

Sum channel transistor 50 and difference channel transistor 51 are clamping circuits, each of the clamping transistors and the corresponding one of switching transistors 45 and 46 being selected as fast switching transistors having matched collector-to-emitter saturation voltage and resistance.

In normal operation of the arrangement of FIG. 7, transistor 44 is initially conducting in saturation, while 43 is held cut-off. Also, switching transistors 45 and 46 are "off" or non-conducting. As the applied input to transistor 47 increases, the voltage at the base of 43 will increase until the back-bias condition of its base-emitter junction is overcome. Transistor 43 will then act as a linear amplifier until the collector voltage thereof drops so as to cut off the base current of transistor 44, which reduces the voltage drop across common resistor and allow increased base current through transistor 43, causing saturation of transistor 43.

The cut-off condition of transistor 44 causes a base current through both of video switching transistors 45 and 46, thereby shunting to ground the respective sum and difference signals on lines 53 and 54. Hence, it is understood that the circuit of FIG. 7 provides shunt switching of the sum and difference video signals of FIG. 5 in response to sum signals in excess of a preselected amplitude.

Figure 8:
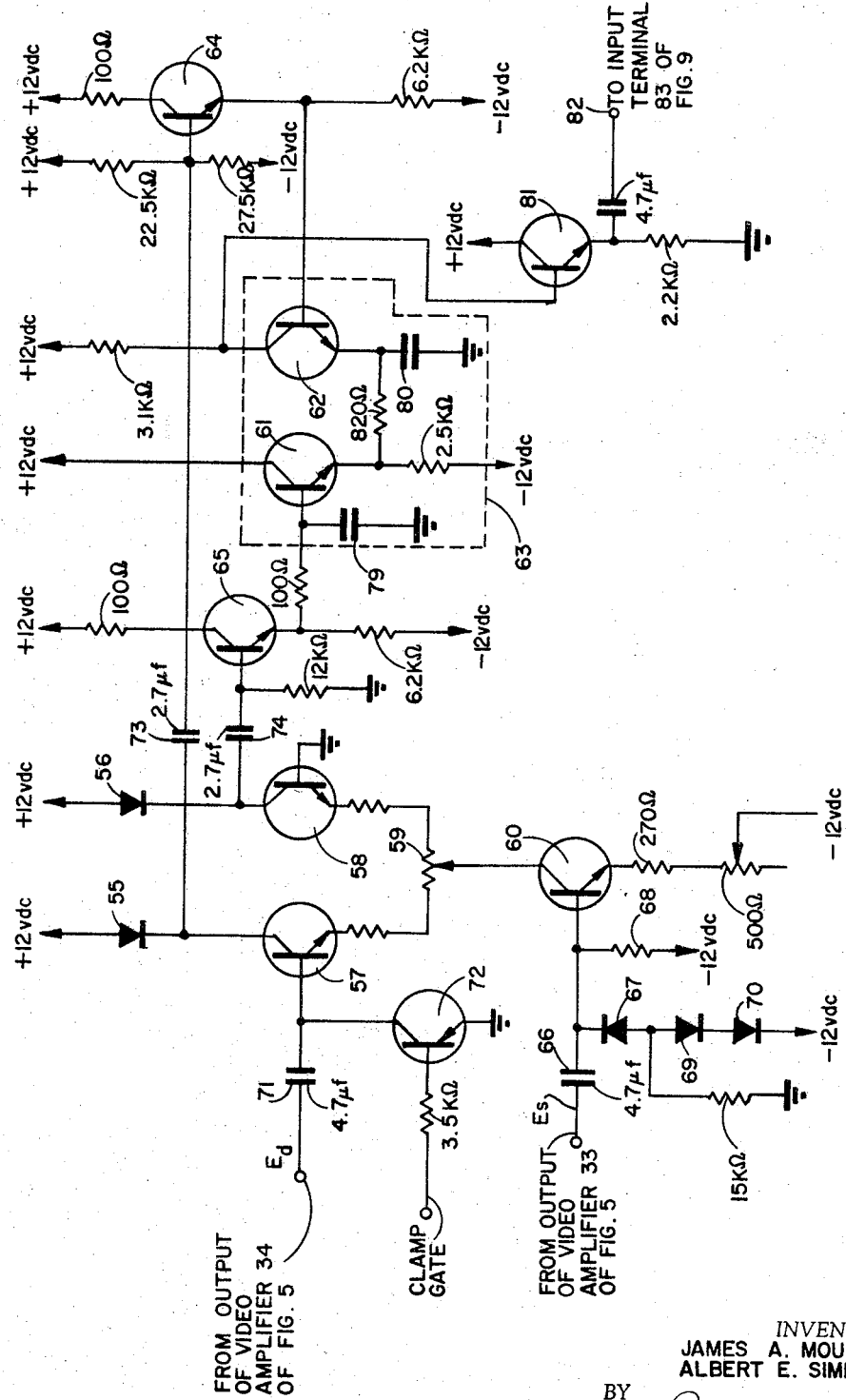

The logarithmic video signal processor 33 of FIG. 5 is described in further detail in FIG. 8.

Referring to FIG. 8, there is illustrated a schematic diagram of a preferred embodiment of element 35 (of FIG. 5), and employing the logarithmic characteristics of diodes 55 and 56 in circuit with respective transistors 57 and 58. The emitters of transistors 57 and 58 are interconnected by, and are commonly connected through, variable resistor 59 to transistor 60. Transistors 62 and 61 comprise a difference amplifier 63 which is coupled through respective emitter-followers 64 and 65 to logarithmic signalling means 55 and 56 respectively.

From the schematic, FIG. 8, it is seen that the $E_s$ input signal (from amplifier 33 of FIG. 5) is fed through a continuously-acting diode clamp (comprising elements 66, 67 and 68) to the base of transistor 60. Diodes 69 and 70 establish the diode clamp level at a point such that with no $E_s$ signal applied, the base current of transistor 60 is negligible. The clamp gate input is provided by the system trigger of the radar system. Transistor 60 acts as a current generator to control the current through diodes 55 and 56. The total current through diodes 55 and 56 will be a function of the $E_s$ signal applied at the base of transistor 60 and the total emitter circuit resistance thereof.

The total current through transistor 60 is the sum of the currents through transistors 57 and 58 summed at the wiper arm of potentiometer 59. This potentiometer is used to balance the currents through the diodes 55 and 56 to give a null output with zero $E_d$ signal applied (from amplifier 34 of FIG. 5). The paths of the collector currents of transistors 57 and 58 are through the two diodes 55 and 56, resulting in a voltage drop across each diode equal to the logarithm of the current through it. Thus, at each collector are identical signals which are a function of the log of the $E_s$ signal applied (in the absence of an $E_d$ signal).

As the $E_d$ signals are applied to the base of transistor 57 through the synchronous clamp elements 71 and 72, the collector currents of transistors 57 and 58 are unbalanced. The negative $E_d$ signal will cause a direct decrease in collector current of transistor 57 and increase in collector current of transistor 58 by action of the constant current generator 60. Hence, the collector voltage signals are a function of the log of $(E_s+E_d)$ and the log of $(E_s-E_d)$, respectively.

The signals, log $(E_s+E_d)$ and log $(E_s-E_d)$, are each capacitively coupled to emitter followers 65 and 64 respectively. The capacitive coupling of 73 and 74 is to eliminate the necessity of drawing base current for the emitter followers, 64 and 65 through the log shaping diodes 55 and 56.

Each emitter-follower provides a low impedance drive for the difference amplifier 63. The log $(E_s+E_d)$ signal is applied at the base of the non-inverting stage 61, while the log $(E_s-E_d)$ signal is applied at the base of the inverting stage 62, so that the output signal at the collector of 62 will be negative. The capacitors 79 and 80 are provided to insure good pulse response and reduce overshoot and spiking.

The output signal is coupled to the output terminal through emitter-follower 81. This emitter-follower provides isolation between the difference amplifier 63 and the succeeding video amplifier (of FIG. 9).

Hence, the device of FIG. 8 provides an analog unipolar video output signal indicative of the ratio $$\left(\beta = \frac{E_d}{E_s}\right)$$

on terminal 82.

Figure 9:
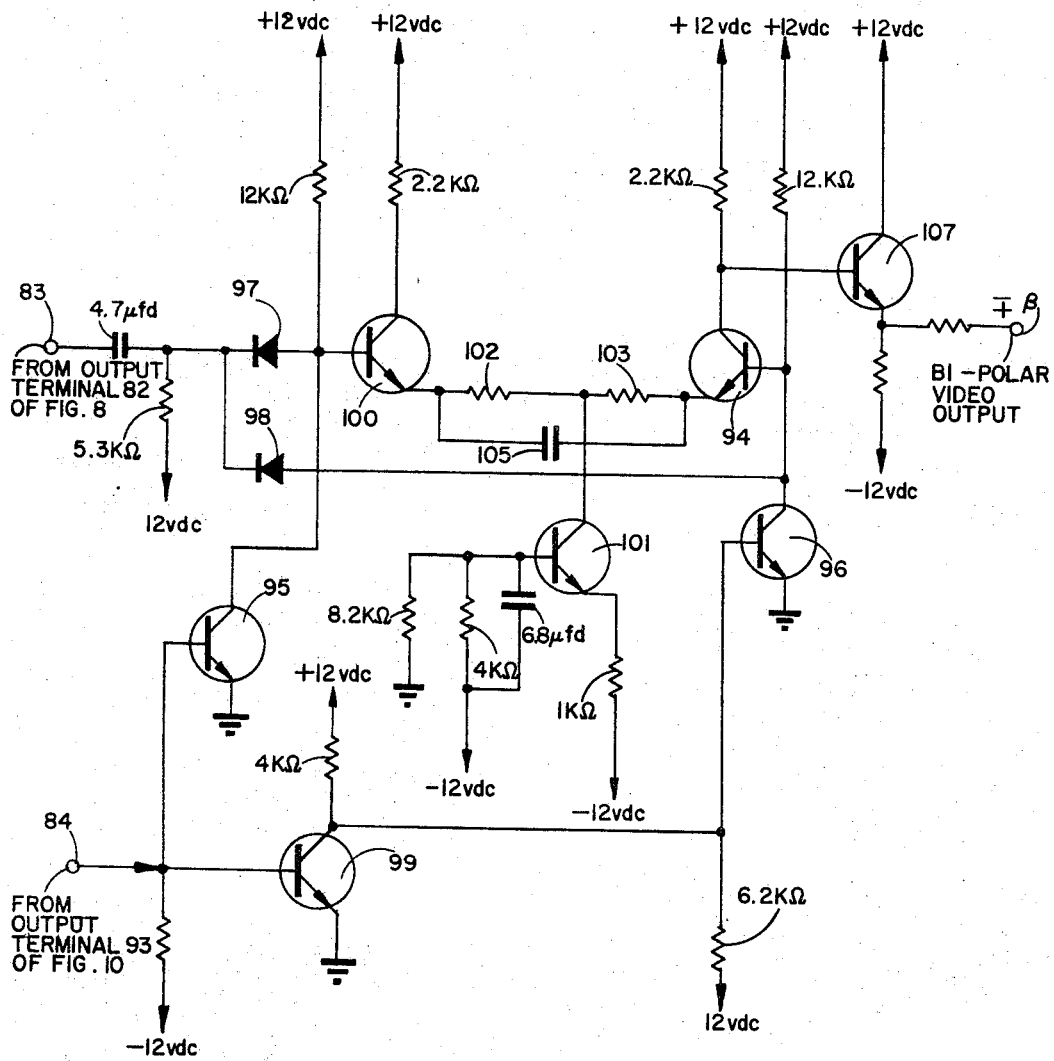

Bipolar video means for providing video output signals of a desired polarity is shown in FIG. 9.

Referring to FIG. 9, there is illustrated a schematic diagram of a preferred arrangement responsive to the unipolar output of the device of FIG. 8, for generating a second video signal of opposite polarity, whereby two video signals of like magnitude and mutually opposite sense are provided. There is further included means responsive to a phase-sense signal for selectively switching one of the two video signals as a desired output signal, corresponding to element 23 of FIG. 5. Such phase sense signal (applied at terminal 84 in FIG. 9) occurs in synchronism with the video signal (applied at terminal 83 in FIG. 9), since both the video signal and the phase-sense switching signal are commonly generated from the IF sum and difference of the applied IF input signals to the device of FIG. 5.

Figure 10:
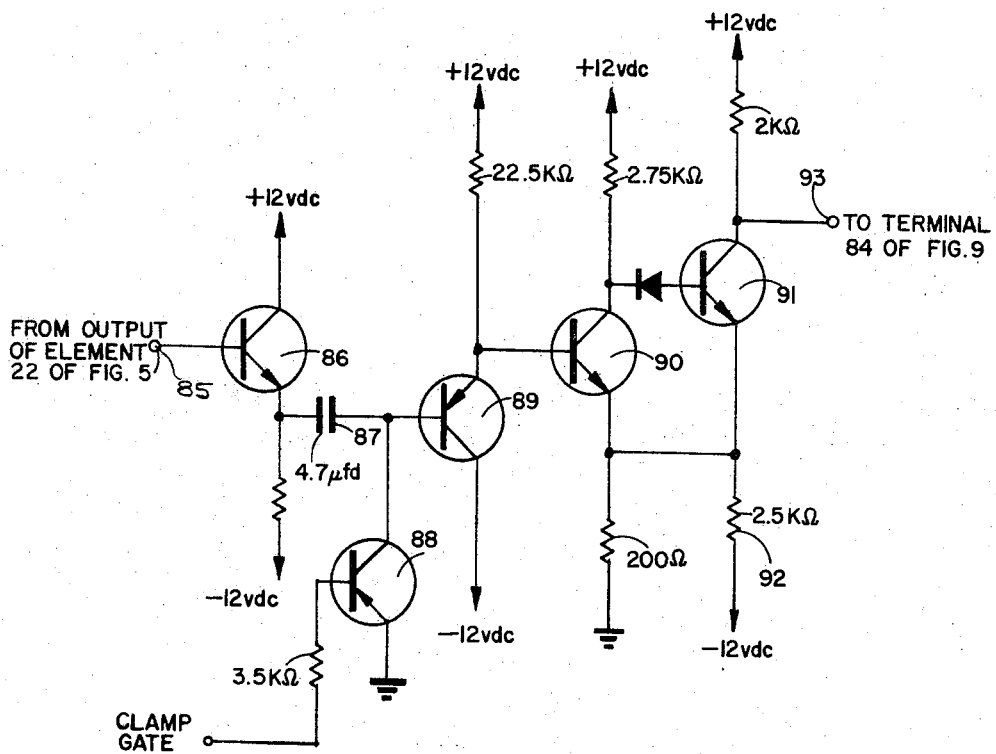

The phase-sense switching signal employed is generated by the polarity-sense Schmitt trigger 31 of FIG. 5, shown more particularly in FIG. 10.

Referring to FIG. 10, there is illustrated a schematic diagram of a preferred arrangement of element 31 (of FIG. 5). The phase-detected difference signal (from phase-detector 22 of FIG. 5) is applied to input terminal 85 of the device of FIG. 10. The input signal is fed through emitter-follower 86 to a synchronous clamp comprising capacitor 87 and transistor 88. The clamped signal is then fed through a temperature-compensating emitter-follower 89 to the input of the Schmitt trigger comprising transistors 90 and 91.

The Schmitt trigger circuit operation is similar to that described for the video Schmitt trigger of FIG. 7, except that the common emitters of FIG. 10 are biased by resistor 92 so that a reversal in the input polarity (at terminal 85) will cause a change of state. In other words, in normal operation of the device of FIG. 10, the Schmitt trigger changes state each time the polarity of the phase-detected input signal is reversed, thereby providing a fast-switching potential. The voltage hysteresis of the Schmitt trigger of FIG. 10 is effectively reduced to zero by the presence of the noise on the phase detected input at terminal 85, and the trigger is preferably designed such that the hysteresis is slightly above such noise level.

Hence, it is seen that the structure of FIG. 10 provides a bipolar switching control signal at output terminal 92, concurrent with the logarithmic video output signal from terminal 82 of FIG. 8, both of which signals are employed by the circuit of FIG. 9 to provide an analog video output signal having a selected sense or polarity.

Referring again to FIG. 9, the unipolar video analog signal (on terminal 83) is fed to two inputs of a difference amplifier comprising transistor 94, one of which inputs is alternatively shunted while the other is unshunted, by means of the cooperation of the shunting transistors 95 and 96. Hence, the polarity of the output of difference amplifier 94 determined by the unshunted one of the two inputs thereto, as controlled by the state of the input on terminal 84.

From the schematic of FIG. 9, it is seen that the unipolar beta signal (on terminal 83) is applied to both difference amplifier inputs simultaneously through the forward biased diodes 97 and 98, which are employed to provide fast response for the amplifier yet give good isolation between the bases of transistors 99 and 94.

With the unipolar signal applied to both inputs of the difference amplifier 94, the polarity selection is accomplished by the polarity sense switch potential on terminal 84. If the switch potential is positive, sufficient base current will flow in transistors 95 and 99 to cause saturation of both transistors. Since the collector of 95 is connected to one input of the difference amplifier, the signal at this point will be shunted to ground through the saturation resistance of transistor 95. Thus the signal is removed from one of the inputs to difference amplifier 94.

At this same time, the saturation of transistor 99 will cause its collector potential to fall well below the contact potential of the base emitter junction of transistor 96. Thus, no base current will flow in transistor 96, which is the switch transistor on the other input to difference amplifier 94. With no base current, transistor 96 will appear as a high impedance, and the beta signal shall appear at this difference amplifier input.

With a negative input switch potential, the reverse effects occur; that is, transistors 95 and 99 are cut off while transistor 96 is saturated. Thus, the beta signal appears at the opposite input to difference amplifier 94.

The difference amplifier 94 employs a balanced configuration, so that the bases of transistors 100 and 95 would maintain the same D.C. level, thus no offset voltage will appear in the output as the signals are switched. Transistor 101 is a constant current generator to provide a high impedance at the junction of the two emitter resistors 102 and 103. The capacitor 105 is provided to improve the pulse response of the amplifier. The capacitor 105 is provided to improve the pulse response of the amplifier. The emitter follower 107 is used to isolate the difference amplifier from external circuits and provide a low impedance output.

By means of the preferred arrangement illustrated in FIGS. 5, 6, 7, 8, 9, and 10, improved monopulse receiver signalling means is provided for generating a signal indicative of the angle-off-boresight of a detected target, i.e., the amplitude ratio of the differences of two severally received signals (A and B) to the sum of them, whereby a signal is provided which is indicative of the angle-off-boresight of a detected target, and which is independent of the signal strength of the received signals, A and B. Also, by means of the signal compression means described, the limited range of the logarithmic detection characteristic of the logarithmic signalling means employed, is usefully adapted to cooperation with input signals having a wider dynamic range or range of magnitudes. Further, because of the fixed gain of the switched gain elements employed, the gain tracking errors of an automatic gain controlled multi-channel signalling system are avoided. Moreover, because of the bipolar switching video switching scheme employed, phase-tracking errors of phase-detected IF signalling systems are reduced.

Accordingly, the device of the subject invention provides improved multi-channel monopulse receiver signalling means.

Although the invention has been illustrated and described in detail, it is to be clearly understood that the same is by way of limitation and example only and is not to be taken by way of limitation, the spirit and scope of this invention being limited only by the terms of the appended claims.

We claim:

1. In a multi-channel monopulse radar receiver having a monopulse difference signal channel and a monopulse sum signal channel for determining the angle-off-boresight of a detected target, signal-compression means for maintaining the signal level of at least one channel of said multi-channel receiver below a preselected signal level comprising, successive amplifying stages in each of the signal channels of said multi-channel receiver;

like switchable means for varying the effective number of said successive stages of each said channel by preselected amounts; and logic means responsive to the signal level of said successive stages of said sum signal channel and cooperating with said switchable means for concurrently switching corresponding successive amplifying stages of said channels of said multi-channel receiver.

2. In a multi-channel signalling system, signal compression means responsive to the signal level of one channel of said system comprising like gain adjusting means interposed in series with each channel of said multi-channel system;

each of said gain adjusting means comprising signal-summing means, a plurality of signal amplifying means, the output of each amplifying means operatively connected to a mutually exclusive one of the inputs of said summing means, the inputs of said amplifying means commonly responsive to said signal channel, and logic means responsive to the signal level of one of said signal channels for alternatively disconnecting corresponding ones of said amplifying means in each channel concurrently from an associated summing means as said signal level increases and reconnecting said amplifying means as said signal level decreases.

3. The device of claim 2 in which said plurality of amplifying means are interconnected in cascade, the input of a first one of said amplifying means being connected to said signal channel.

4. The device of claim 2 in which said plurality of amplifying means are interconnected in cascade, the input of a first one of said amplifying means being connected to said signal channel, and in which said logic means comprises signal gating means interposed between said summing means and each successive amplifying means of each of said channels, and a threshold amplifier responsively connected to the output of a mutually exclusive one of each succeeding amplifying means of one of said channels, the gating means associated with said amplifier means and a corresponding gating means of the other of said channels being responsively connected to said threshold amplifier.

5. The device of claim 2 comprising an A-C signalling system for severally amplifying the sum and difference of two A-C input signals, and further comprising
video means responsive to said A-C difference signal summing means for severally providing first and second video signals of mutually opposite polarity; and
polarized switching means interposed at the output of said video means and responsive to the phase-sense of said amplified A-C difference signal relative to said amplified A-C sum signal for selectively switching that video signal having a polarity corresponding to the phase-sense of said A-C difference signal.

6. The device of claim 2 in which the said plurality of amplifying means are A-C signal amplifiers connected in cascade for severally amplifying the sum and difference of two A-C input signals and in which is further included video signalling means comprising:
phase-sensitive detection means responsive to the last amplifier of said cascaded amplifiers of a first and second channel for providing a switching control signal indicative of the relation phase-sense of said A-C difference signal to said sum signal;
video signalling and inverting means responsive to said signal summing means of said A-C difference signal channel for severally providing first and second video difference signals of mutually opposite polarity; and
switching means interposed at the output of said video means and responsive to said switching control signal for selectively switching-on that video difference signal having a polarity corresponding to the phase sense of said A-C difference signal.

7. In a multi-channel signalling system for severally amplifying the sum and difference of two A-C input signals,
a sum and difference signal channel, each of said channels comprising,
signal summing means,
a plurality of A-C amplifiers interconnected in cascade, the output of each amplifier operatively connected to a mutually exclusive one of the inputs of said summing means,
signal gating means interposed between said summing means and each said amplifier,
said sum channel further comprising
a plurality of threshold amplifiers each responsive to the signal level of a mutually exclusive one of said sum channel amplifiers for providing a gating signal, the signal gating means associated with said amplifier and the corresponding gating means of said difference channel being responsively connected to said threshold amplifier,
said difference channel further comprising
video means responsive to the signal summing means of said difference signal channel for severally providing first and second video difference signals of mutually opposite polarity, and
switching means interposed at the output of said video means and responsive to the phase-sense of said amplified A-C difference signal to said amplified sum signal for slectively switching that one of said video signals having a polarity corresponding to the phase-sense of said amplified A-C difference signal.

8. In a multi-channel signalling system for severally amplifying the sum and difference of two A-C input signals,
a sum and difference signal channel, each said channels comprising
video signal summing means,
a plurality of A-C amplifiers interconnected in cascade, the output of each amplifier operatively connected to a mutually exclusive one of the inputs of said summing means,
video detectors interposed between said video summing means and each said A-C amplifier,
video signal gating means interposed at the output of each said video detectors,
logarithmic signalling means responsive to the output of said video signal summing means;
said sum channel further comprising
a plurality of gating signal means each responsive to the signal level of a mutually exclusive one of said sum channel video detectors for providing a gating signal, the video gating means associated with said detector and the corresponding gating means of said difference channel being responsively connected to said gating signal means;
a phase detector responsive to the last amplifier of said cascaded amplifiers of each said channels for providing a phase-sensitive signal;
logarithmic signalling means responsive to said video signalling means for providing a video output signal indicative of the ratio of the difference between the inputs thereto to the sum thereof;
bipolar video, signalling means connected to said logarithmic signalling means and responsive to said phase-sensitive signal for providing a video output signal of a selected polarity.

References Cited
UNITED STATES PATENTS 3,158,818 11/1964 Plumpe _____ 330—30 X
3,165,740 1/1965 Stoney _____ 334—16

ARTHUR GAUSS, *Primary Examiner.*

R. H. PLOTKIN, *Assistant Examiner.*